(12) United States Patent
Sano et al.

(10) Patent No.: US 9,399,958 B2
(45) Date of Patent: Jul. 26, 2016

(54) SPECIFYING METHOD OF EGR RATE IN INTERNAL COMBUSTION ENGINE AND CONTROL APPARATUS OF INTERNAL COMBUSTION ENGINE

(75) Inventors: Takeshi Sano, Gotenba (JP); Shinji Ikeda, Mishima (JP); Yusuke Suzuki, Hadano (JP); Soichiro Tanaka, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 356 days.

(21) Appl. No.: 13/695,713

(22) PCT Filed: May 11, 2010

(86) PCT No.: PCT/JP2010/057949
§ 371 (c)(1),
(2), (4) Date: Nov. 1, 2012

(87) PCT Pub. No.: WO2011/141994
PCT Pub. Date: Nov. 17, 2011

(65) Prior Publication Data
US 2013/0042843 A1 Feb. 21, 2013

(51) Int. Cl.
*F02M 25/07* (2006.01)
*F02D 21/08* (2006.01)
(Continued)

(52) U.S. Cl.
CPC .............. *F02D 21/08* (2013.01); *F02D 35/023* (2013.01); *F02D 41/0072* (2013.01); *Y02T 10/47* (2013.01)

(58) Field of Classification Search
CPC ............ F02M 25/0702; F02D 41/0072; F02D 41/0055; F02D 35/023–35/024; F02D 41/0075; F02D 41/0062

USPC ...................... 73/114.74; 123/406.41, 568.16
See application file for complete search history.

(56) References Cited

U.S. PATENT DOCUMENTS 4,164,206 A * 8/1979 Toelle ................. F02D 41/0072
123/568.27
4,622,939 A * 11/1986 Matekunas ........... F02D 35/023
123/406.41
(Continued)

FOREIGN PATENT DOCUMENTS

JP 56-159556 A 12/1981
JP 63-134845 A 6/1988
(Continued)

OTHER PUBLICATIONS

Heywood, John B, "Internal Combustion Engine Fundamentals," 1988, McGraw-Hill Inc., p. 907.*
(Continued)

*Primary Examiner* — Hung Q Nguyen
*Assistant Examiner* — Josh Campbell
(74) *Attorney, Agent, or Firm* — Sughrue Mion, PLLC (57) ABSTRACT

To accurately specify an EGR rate from an output value of an in-cylinder pressure sensor, a specifying method of an EGR rate in an internal combustion engine of the present invention acquires an output value of an in-cylinder pressure sensor at an intake stroke to calculate comparison data related to an in-cylinder pressure at the intake stroke from the acquired sensor output value. An output value of the in-cylinder pressure sensor at an exhaust stroke of the same cycle is also acquired to calculate comparison data related to the in-cylinder pressure at the exhaust stroke from the acquired sensor output value. Two comparison data are compared to specify the EGR rate of an air-fuel mixture provided for combustion from a difference between the values.

12 Claims, 7 Drawing Sheets

(51) Int. Cl.
*F02D 35/02* (2006.01)
*F02D 41/00* (2006.01)

(56) References Cited

U.S. PATENT DOCUMENTS

| | | | | |
|---|---|---|---|---|
| 5,632,257 | A * | 5/1997 | Machida et al. | 123/435 |
| 5,675,080 | A * | 10/1997 | Wada | 73/114.74 |
| 5,703,285 | A * | 12/1997 | Shimizu | F02D 35/023 340/439 |
| 5,775,283 | A * | 7/1998 | Sawai et al. | 123/184.53 |
| 5,918,582 | A * | 7/1999 | Itoyama et al. | 123/568.29 |
| 5,936,235 | A * | 8/1999 | Minamitani | G01L 9/0076 250/227.16 |
| 5,964,820 | A * | 10/1999 | Miwa | F02D 41/0072 123/568.16 |
| 6,257,214 | B1 * | 7/2001 | Bidner | F02D 41/0055 123/568.16 |
| 6,298,299 | B1 * | 10/2001 | Itoyama et al. | 701/101 |
| 6,502,549 | B1 | 1/2003 | Hoshino et al. | |
| 7,623,955 | B1 * | 11/2009 | Rackmil et al. | 701/115 |
| 7,757,545 | B2 * | 7/2010 | Sato et al. | 73/114.16 |
| 2007/0101965 | A1 * | 5/2007 | Asahara | B60K 6/442 123/192.1 |

FOREIGN PATENT DOCUMENTS

| | | |
|---|---|---|
| JP | 07-189815 A | 7/1995 |
| JP | 08-017764 A | 1/1996 |
| JP | 09-151806 A | 6/1997 |
| JP | 11-257149 A | 9/1999 |
| JP | 2000-054889 A | 2/2000 |

OTHER PUBLICATIONS

International Search Report of PCT/JP2010/057949 dated Jul. 27, 2010.

* cited by examiner

SPECIFYING METHOD OF EGR RATE IN INTERNAL COMBUSTION ENGINE AND CONTROL APPARATUS OF INTERNAL COMBUSTION ENGINE

CROSS REFERENCE TO RELATED APPLICATIONS

This application is a National Stage of International Application No. PCT/JP2010/057949 filed May 11, 2010, the contents of all of which are incorporated herein by reference in their entirety.

TECHNICAL FIELD

The present invention relates to a method of specifying an EGR rate from an output signal of an in-cylinder pressure sensor in an internal combustion engine. The present invention also relates to a control apparatus that controls an EGR rate based on the EGR rate specified from an output signal of an in-cylinder pressure sensor.

BACKGROUND ART

In an internal combustion engine for an automobile, exhaust gas recirculation (EGR) for recirculating part of exhaust gas to an intake side is widely implemented. The execution of the EGR can reduce NOx in the exhaust gas, and at the same time, can improve the fuel efficiency.

The effect of the EGR can be increased by introducing more EGR gas into the cylinder, that is, by increasing the EGR rate in the cylinder. However, on the other hand, the higher the EGR rate in the cylinder, the higher the possibility of variations in the EGR rate between the cylinders and the higher the possibility of degradation in the combustion. To prevent the situation, the EGR rate in the cylinder needs to be accurately specified. It is also necessary to precisely control the EGR rate to prevent the degradation in the combustion.

However, the EGR rate in the cylinder cannot be directly measured and can only be indirectly specified based on some information. A heat release rate and a combustion period are conventionally used as the information. It is known that the EGR rate in the cylinder is closely related to the heat release rate and the combustion period. Although the heat release rate and the combustion period cannot be directly measured, an internal combustion engine including an in-cylinder pressure sensor can use an output signal of the in-cylinder pressure sensor to calculate the heat release rate and the combustion period. For example, Japanese Patent Laid-Open No. 2000-054889 describes calculation of the heat release rate at each crank angle from an output signal of an in-cylinder pressure sensor and control of the EGR rate to bring the heat release rate pattern in line with a predetermined waveform pattern.

However, since the combustion state of the internal combustion engine is affected by a formation condition of an air-fuel mixture in the cylinder or an ignition status, variations in the heat release rate and the combustion period occur between cycles even if the same operation state is maintained. Therefore, statistical processing of the variations is necessary to accurately estimate the EGR rate from the heat release rate and the combustion period, and a large number of samples are necessary. The higher the number of samples, the higher the estimation accuracy of the EGR rate. However, a large number of cycles are consumed accordingly, and the responsiveness of the EGR rate control is reduced.

Meanwhile, for example, as described in Japanese Patent Laid-Open No. 7-189815, a method of using information independent of the combustion state to specify the EGR rate is also known. In the method described in the publication, an output signal of an in-cylinder pressure sensor at an intake stroke is used as information for specifying the EGR rate. It is a known fact that the intake pipe pressure changes depending on the EGR rate, and the in-cylinder pressure and the intake pipe pressure at the intake stroke, in which an intake valve is open, are correlated. Therefore, in an internal combustion engine including the in-cylinder pressure sensor, the output signal of the in-cylinder pressure sensor at the intake stroke can be observed to indirectly specify the EGR rate in the cylinder.

Figure 8:
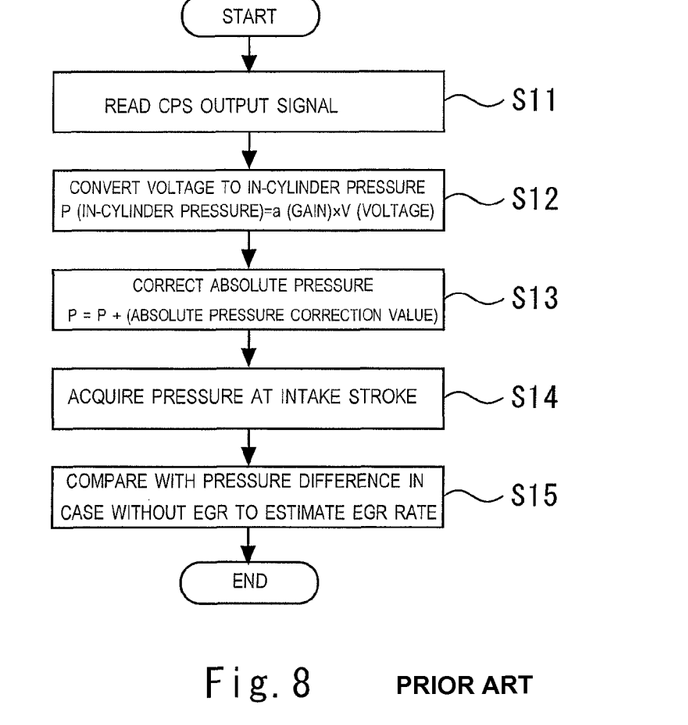
FIG. 8 is a flow chart for describing the conventional method for specifying the EGR rate from an output signal of an in-cylinder pressure sensor at an intake stroke.
Figure 9:
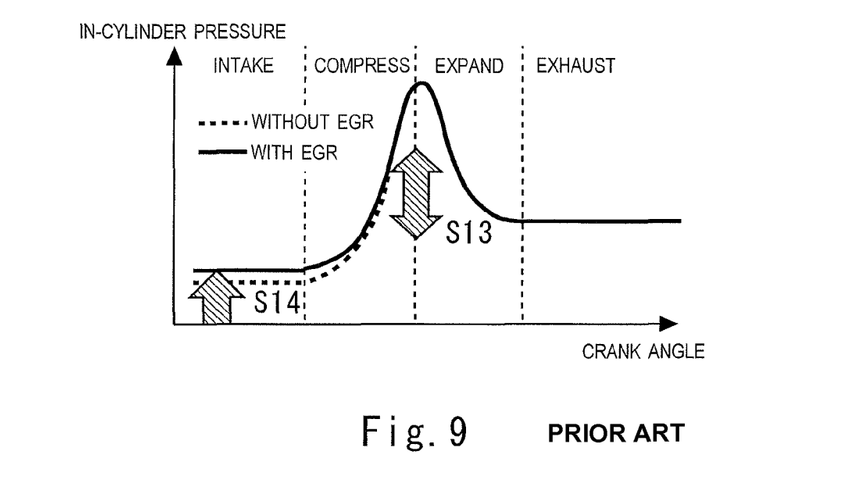
FIG. 9 is an in-cylinder pressure/crank angle diagram for describing the conventional method for specifying the EGR rate from the output signal of the in-cylinder pressure sensor at the intake stroke.

The conventional method for specifying the EGR rate from the output signal of the in-cylinder pressure sensor at the intake stroke can be specifically described using a flow chart of FIG. 8 and an in-cylinder pressure/crank angle diagram of FIG. 9. The in-cylinder pressure/crank angle diagram of FIG. 9 illustrates a change in the in-cylinder pressure from an intake stroke to an exhaust stroke, wherein a case with the EGR and a case without the EGR are compared.

As shown in the flow chart of FIG. 8, in the conventional method, an output signal of an in-cylinder pressure sensor (CPS) is read (step S11), and the read output signal is multiplied by a predetermined gain to convert a voltage value to a pressure value (step S12). However, although an absolute pressure of the in-cylinder pressure is necessary to specify the EGR rate, since the in-cylinder pressure sensor outputs a change in the pressure by a voltage, the pressure value converted from the voltage value includes an offset relative to the absolute pressure of the in-cylinder pressure. Therefore, as expressed by an arrow S13 in FIG. 9, absolute pressure correction of the pressure value converted from the voltage value is performed (step S13). Examples of the method of absolute pressure correction include the following methods. In an example of the method, it is assumed that the in-cylinder pressure at the intake stroke is equal to the measurement value by the intake pipe pressure sensor, and the absolute pressure correction value is determined based on the output signal of the intake pipe pressure sensor. In another example of the method, the compression stroke following the intake stroke is assumed as adiabatic compression, and the absolute pressure correction value is determined to realize $PV^k$=certain relationship.

After the absolute pressure correction, as expressed by an arrow S14 in FIG. 9, the in-cylinder pressure at the intake stroke is acquired (step S14). More specifically, the in-cylinder pressure after the absolute pressure correction is used to calculate an indicated average effective pressure in an interval of the intake stroke. In the conventional method, the in-cylinder pressure at the intake stroke obtained in this way is compared with the in-cylinder pressure in the case without the EGR to specify the EGR rate in the cylinder from the difference (step S15). The in-cylinder pressure at the intake stroke as information for specifying the EGR rate does not depend on the combustion state, unlike the heat release rate, the combustion period, and the like. Therefore, according to the method of using the in-cylinder pressure at the intake stroke, it is expected that the EGR rate can be specified more accurately than in the method of using the heat release rate and the combustion period.

However, in reality, it is difficult to ensure the accuracy of the method for specifying the EGR rate using the in-cylinder pressure at the intake stroke, as in the case of using the heat release rate and the combustion period. Although the absolute pressure correction is necessary to obtain the in-cylinder pressure at the intake stroke from the output signal of the in-cylinder pressure sensor, inclusion of an error in the absolute pressure correction value cannot be prevented in any of the correction methods. Moreover, since the magnitude of the error is in a similar order as the change in the in-cylinder pressure at the EGR execution, the effect of the error in the absolute pressure correction on the accuracy of specifying the EGR rate is significantly large.

SUMMARY OF INVENTION

As described above, accurately specifying the EGR rate in the cylinder by a realistic method is an important issue in improving the exhaust gas performance and the fuel efficiency through the utilization of the EGR. The present invention has been made in view of the above issue, and an object of the present invention is to accurately specify an EGR rate from an output signal of an in-cylinder pressure sensor.

In a specifying method of an EGR rate according to the present invention, a value of a parameter related to an in-cylinder pressure at an intake stroke (hereinafter, "first in-cylinder pressure related parameter") is calculated from an output signal of an in-cylinder pressure sensor at the intake stroke. A value of a parameter related to the in-cylinder pressure at an exhaust stroke (hereinafter, "second in-cylinder pressure related parameter") is calculated from an output signal of the in-cylinder pressure sensor at the exhaust stroke of the same cycle. An EGR rate of an air-fuel mixture provided for combustion in the same cycle is specified from a difference between the values of the first in-cylinder pressure related parameter and the second in-cylinder pressure related parameter.

In this way, by using a difference between the values of the in-cylinder pressure related parameters obtained at the intake stroke and the exhaust stroke, that is a relative value, instead of the values of the in-cylinder pressure related parameters calculated from the output signals of the in-cylinder pressure sensor, the absolute pressure correction as an error factor can be eliminated from the process for specifying the EGR rate. Moreover, the output signal of the in-cylinder pressure sensor at the intake stroke and the output signal of the in-cylinder pressure sensor at the exhaust stroke are information independent of the combustion state. Therefore, according to the specifying method of the EGR rate of the present invention, the EGR rate can be accurately specified from the output signals of the in-cylinder pressure sensor based on a nonconventional, realistic method.

It is preferable to use indicated work at the strokes as the in-cylinder pressure related parameters. The indicated work can be calculated from the in-cylinder pressures obtained by converting the output signals of the in-cylinder pressure sensor. A difference between values of the indicated work at the intake stroke and the indicated work at the exhaust stroke can be obtained to calculate a pump loss. There is a certain relationship between the magnitude of the pump loss and the EGR rate.

It is also preferable to calculate indicated average effective pressures at the strokes as the in-cylinder pressure related parameters. The indicated average effective pressures can be calculated from the in-cylinder pressures obtained by converting the output signals of the in-cylinder pressure sensor. A difference between values of the indicated average effective pressure at the intake stroke and the indicated average effective pressure at the exhaust stroke can be obtained to accurately estimate a degree of increase in the intake pipe pressure due to the implementation of the EGR.

The in-cylinder pressure at a predetermined crank angle of the intake stroke and the in-cylinder pressure at a predetermined crank angle of the exhaust stroke may be used as the in-cylinder pressure related parameters. The in-cylinder pressures can be obtained by converting the output signals of the in-cylinder pressure sensor. A difference between values of the in-cylinder pressure at the intake stroke and the in-cylinder pressure at the exhaust stroke is obtained to cancel out an offset included in the output signals of the in-cylinder pressure sensor. As a result, only components related to the EGR rate can be extracted from the output signals of the in-cylinder pressure sensor.

A method of estimating the EGR rate from a pressure difference between front and back of an EGR valve and from a degree of EGR valve opening when the internal combustion engine includes the EGR valve is known. However, there is a large difference between the known method and the specifying method of the EGR rate according to the present invention. The EGR rate obtained by the known method is just an EGR rate predicted from the current or future degree of EGR valve opening. On the other hand, in the method of the present invention, information reflecting the gas state in the actual cylinder is used to specify the EGR rate. Therefore, according to the method of the present invention, the EGR rate of the air-fuel mixture actually provided for the combustion at the present time can be specified, instead of the prediction value of the EGR rate.

The present invention also provides a control apparatus of an internal combustion engine using the above-mentioned specifying method of the EGR rate.

According to an aspect, the control apparatus is configured as a control apparatus used in an internal combustion engine including: an actuator that can change the EGR rate; and an in-cylinder pressure sensor. The control apparatus includes a computing element and a control element. The computing element calculates a value of the first in-cylinder pressure related parameter from the output signal of the in-cylinder pressure sensor at the intake stroke and calculates a value of the second in-cylinder pressure related parameter from the output signal of the in-cylinder pressure sensor at the exhaust stroke of the same cycle. The computing element calculates a difference (hereinafter, "inter-parameter difference") between the values of the first in-cylinder pressure related parameter and the second in-cylinder pressure related parameter for one or a plurality of cycles. The control element controls the EGR rate by operation of the actuator based on the inter-parameter difference calculated by the computing element.

A preferable function of the operation element is calculation of indicated work at the intake stroke as the first in-cylinder pressure related parameter from the in-cylinder pressure obtained by converting the output signal of the in-cylinder pressure sensor. Another preferable function is calculation of indicated work at the exhaust stroke as the second in-cylinder pressure related parameter from the in-cylinder pressure obtained by converting the output signal of the in-cylinder pressure sensor.

It is also preferable that the computing element calculates an indicated average effective pressure at the intake stroke as the first in-cylinder pressure related parameter from the in-cylinder pressure obtained by converting the output signal of the in-cylinder pressure sensor and calculates an indicated average effective pressure at the exhaust stroke as the second in-cylinder pressure related parameter from the in-cylinder pressure obtained by converting the output signal of the in-cylinder pressure sensor.

It is also preferable that the computing element calculates the in-cylinder pressure at a predetermined crank angle of the intake stroke obtained by converting the output signal of the in-cylinder pressure sensor as the first in-cylinder pressure related parameter and calculates the in-cylinder pressure at a predetermined crank angle of the exhaust stroke obtained by converting the output signal of the in-cylinder pressure sensor as the second in-cylinder pressure related parameter.

A preferable function of the control element is operation of the actuator based on a statistic of the inter-parameter difference obtained for a plurality of cycles. It is preferable that the statistic is an average value. However, a median value, a minimum value, or a maximum value can also be used.

It is also preferable that the control element operates the actuator based on the inter-parameter difference obtained for one cycle. To specify the EGR rate of the air-fuel mixture provided for the combustion, calculation of the inter-parameter difference in one cycle is enough.

It is also preferable that a function of the control element is a function of specifying the EGR rate from the inter-parameter difference based on prepared data and operating the actuator to bring the specified EGR rate in line with a target EGR rate. The inter-parameter difference for specifying the EGR rate may be a statistic of the inter-parameter difference obtained for a plurality of cycles or may be an inter-parameter difference obtained for one cycle.

The control apparatus can also include a failure diagnosis element that diagnoses a failure of the actuator. It is preferable that the failure diagnosis element functions to operate the actuator to change the EGR rate and to diagnose the failure of the actuator based on a change in the difference between the values of the first in-cylinder pressure related parameter and the second in-cylinder pressure related parameter before and after the operation.

DESCRIPTION OF EMBODIMENTS

Figure 3:
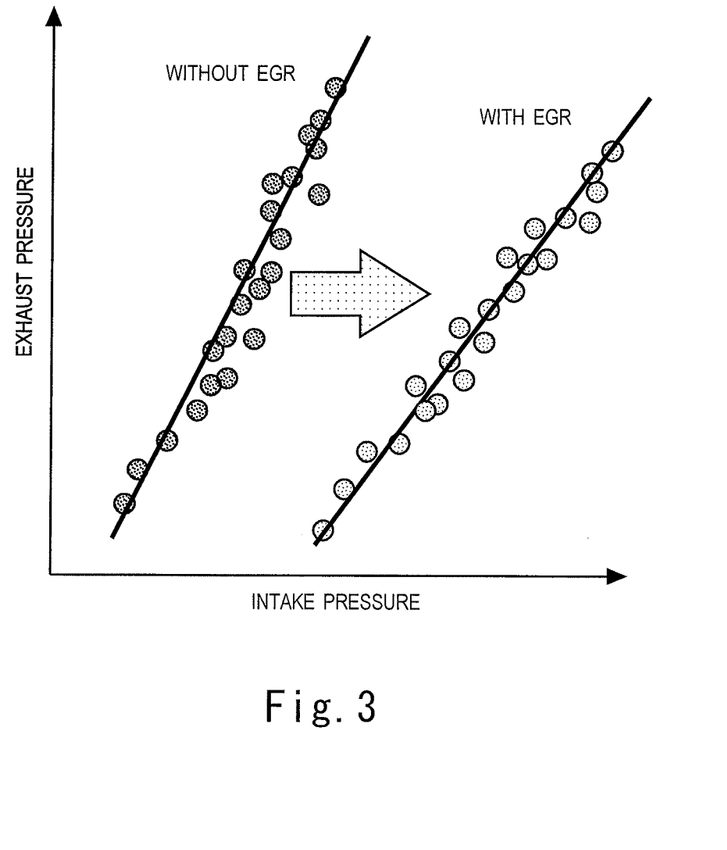
FIG. 3 is a diagram showing a result of an experiment for searching an effect of presence/absence of EGR on a relationship between an intake pressure and an exhaust pressure.

First, details of an experiment conducted in a creation process of the present invention and facts as a basis of the present invention confirmed from the results will be described with reference to the drawings. In the experiment, an effect of presence/absence of EGR on a relationship between an intake pressure and an exhaust pressure is searched while changing an operation condition of an internal combustion engine (hereinafter, "engine"). FIG. 3 shows a graph of the results. As shown in FIG. 3, it is recognized that the intake pressure and the exhaust pressure are correlated when the EGR is executed and when the EGR is not executed. This is because there is a causal relationship, in which the intake air amount increases when the intake pressure increases, the combustion gas increases when the intake air amount increases, and the exhaust pressure increases when the combustion gas increases. Meanwhile, when an exhaust pipe and an intake pipe are connected after the execution of the EGR, a high-pressure exhaust gas flows into the intake pipe, and the intake pressure increases. As a result, as shown by an arrow in FIG. 3, the relationship between the intake pressure and the exhaust pressure changes. As a result of the execution of the EGR, the difference between the exhaust pressure and the intake pressure is reduced compared to when the EGR is not executed. The measurement data in the case with the EGR shown in FIG. 3 indicates a relationship between the intake pressure and the exhaust pressure at a certain EGR rate. If the EGR rate is changed, the relationship between the intake pressure and the exhaust pressure is further changed, and the difference between the exhaust pressure and the intake pressure is also changed.

An invention created based on the above facts is a specifying method of an EGR rate of the present invention. An embodiment of the present invention can be described with reference to a flow chart of FIG. 1 and an in-cylinder pressure/crank angle diagram of FIG. 2. The in-cylinder pressure/crank angle diagram of FIG. 2 shows a change in the in-cylinder pressure from the intake stroke to the exhaust stroke, wherein the case with the EGR and the case without the EGR are compared.

Figure 1:
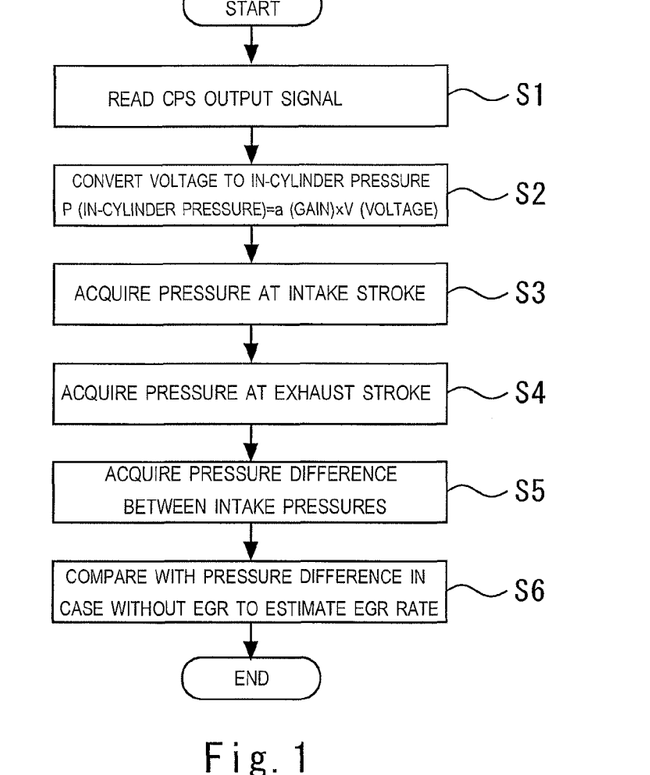
FIG. 1 is a flow chart for describing an embodiment of a specifying method of an EGR rate of the present invention.

As shown in the flow chart of FIG. 1, in the specifying method of the EGR rate of the present embodiment, an output signal of an in-cylinder pressure sensor (CPS) is read in step S1. In the following step S2, the read output signal is multiplied by a predetermined gain and is converted from a voltage value to a pressure value. Here, in the conventional method for specifying the EGR rate from the output signal of the in-cylinder pressure sensor at the intake stroke (conventional method described with reference to FIGS. 8 and 9), the absolute pressure correction of the pressure value converted from the voltage value is necessary. However, in the method of the present embodiment, the absolute pressure correction as an error factor can be eliminated from the procedure as a result of the execution of a process of the following steps.

Figure 2:
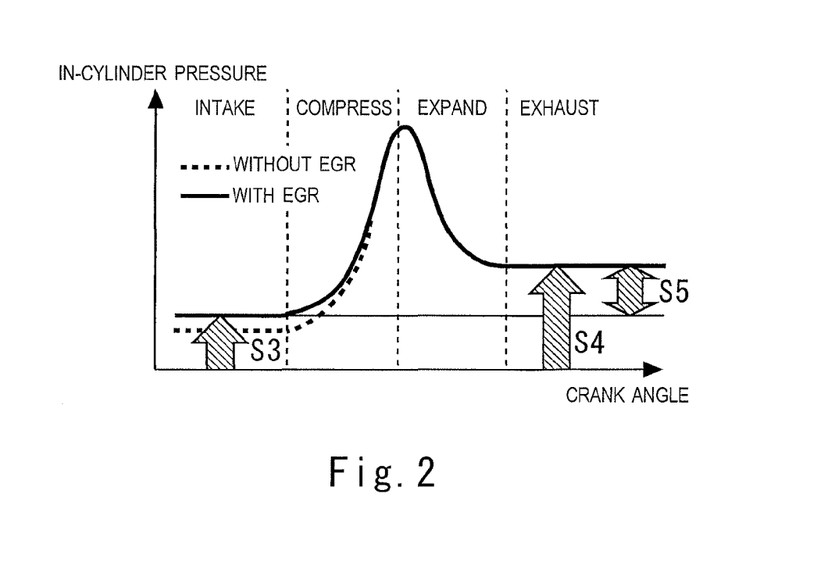
FIG. 2 is an in-cylinder pressure/crank angle diagram for describing the embodiment of the specifying method of the EGR rate of the present invention.

In step S3, as expressed by an arrow S3 in FIG. 2, the in-cylinder pressure at a predetermined crank angle of the intake stroke is acquired. In the following step S4, as expressed by an arrow S4 in FIG. 2, the in-cylinder pressure at a predetermined crank angle of the exhaust stroke of the same cycle is acquired. In step S5, as expressed by an arrow S5 in FIG. 2, a pressure difference between the in-cylinder pressure at the exhaust stroke acquired in step S4 and the in-cylinder pressure at the intake stroke acquired in step S3 is calculated.

As a result of the calculation of the pressure difference between the in-cylinder pressure at the intake stroke and the in-cylinder pressure at the exhaust stroke, the offset included in the output signal of the in-cylinder pressure sensor can be cancelled out to extract only components related to the EGR rate. Therefore, the absolute pressure correction as in the conventional method does not have to be performed. Moreover, since the in-cylinder pressures at the intake stroke and at the exhaust stroke do not depend on the combustion state, the pressure difference of the in-cylinder pressures does not depend on the combustion state. Therefore, using the pressure difference obtained in step 5 as information for specifying the EGR rate can accurately specify the EGR rate from the output signal of the in-cylinder pressure sensor.

In the method of the present embodiment, how the pressure difference between the in-cylinder pressures at the intake stroke and at the exhaust stroke is changed by the EGR rate when the pressure difference in the case without the EGR is used as a reference is acquired in advance as experiment data. In step S6, the pressure difference obtained in step S5 is compared with the pressure difference in the case without the EGR. Based on the experiment data, the EGR rate in the cylinder (EGR rate of the air-fuel mixture provided for the combustion) is specified from the result of comparison with the pressure difference in the case without the EGR. For the comparison method, any one of a method of calculating a ratio of the two and a method of calculating a difference between the two can be adopted.

Figure 4:
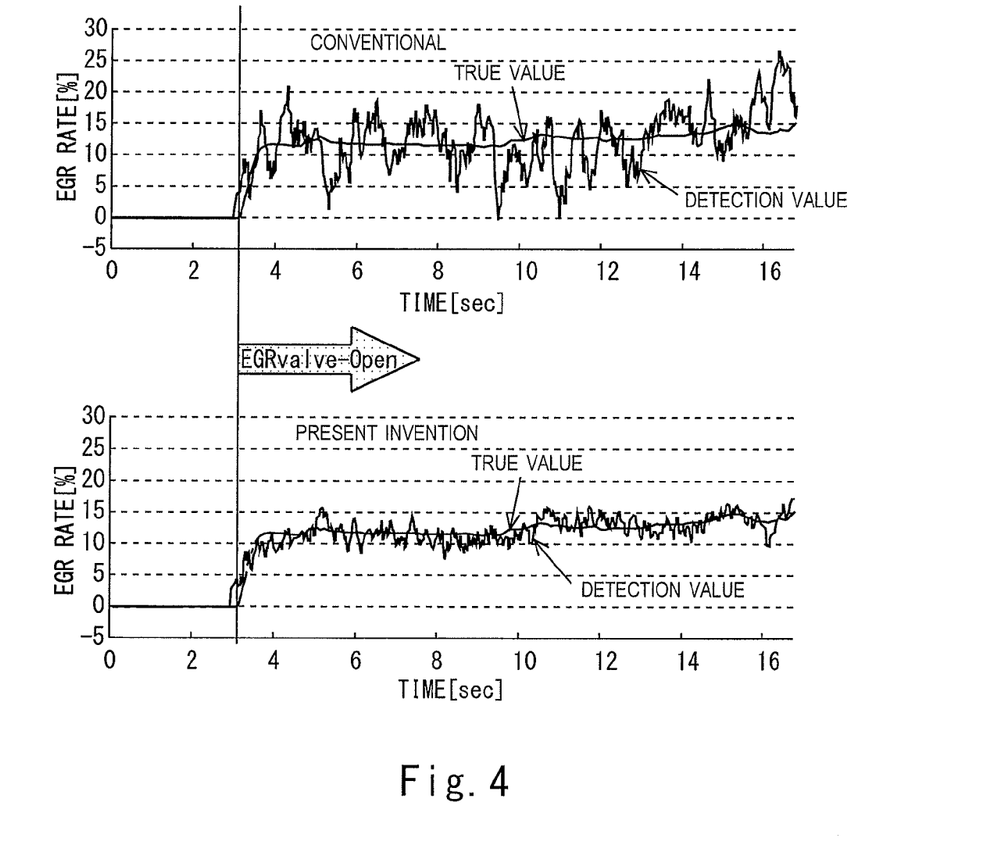
FIG. 4 is a diagram showing a result of an experiment for comparing accuracy of specifying the EGR rate between a conventional method and the method of the present invention.

FIG. 4 is a diagram showing results of the experiments comparing the accuracy of specifying the EGR rate between the conventional method and the method of the present embodiment. In an upper graph of FIG. 4, the actual EGR rate (true value) and the EGR rate specified by the conventional method (detection value) are illustrated. In a lower graph, the actual EGR rate (true value) and the EGR rate (detection value) specified by the method of the present embodiment are illustrated. From the comparison of the two graphs, it can be recognized that the method of the present embodiment can specify the EGR rate in the cylinder with considerably higher accuracy than in the conventional method.

As is clear from the foregoing embodiment, the specifying method of the EGR rate of the present invention has a feature in the information for specifying the EGR rate in the cylinder. In the embodiment, the in-cylinder pressure at a predetermined crank angle converted from the output signal of the in-cylinder pressure sensor is set as a parameter, and the difference between the values of the parameters at the intake stroke and at the exhaust stroke is used as the information for specifying the EGR rate. As a result of the calculation of the difference between the values of the parameters, the offset included in the output signal of the in-cylinder pressure sensor can be cancelled out, and the absolute pressure correction necessary in the conventional method is not necessary.

However, the parameters used in the embodiment are just examples of the parameters that can be used in the method of the present invention. Any parameters related to the in-cylinder pressure (in-cylinder pressure related parameters) obtained by the output signal of the in-cylinder pressure sensor can be used in the method of the present invention. For example, indicated work at the strokes can be used as the in-cylinder pressure related parameters. A difference between the values of the indicated work at the intake stroke and the indicated work at the exhaust stroke can be obtained to calculate the pump loss. However, the integration interval in the calculation of the indicated work is an integration interval corresponding between the intake stroke and the exhaust stroke. For the same reason that the difference between the exhaust pressure and the intake pressure is related to the EGR rate, there is a certain relationship between the magnitude of the pump loss and the EGR rate. Therefore, the relationship can be checked in advance in an experiment to specify the EGR rate from the value of the pump loss.

Indicated average effective pressures at the strokes can also be used as the in-cylinder pressure related parameters. According to the indicated average effective pressures, as in the case of using the indicated work, the effect of a change in the in-cylinder pressure is smaller than when the in-cylinder pressure at a crank angle is used. Therefore, the difference between the values of the indicated average effective pressure at the intake stroke and the indicated average effective pressure at the exhaust stroke can be calculated to more accurately estimate the degree of increase in the intake pipe pressure caused by the implementation of the EGR. More specifically, when the indicated average effective pressures or the indicated work is used as the in-cylinder pressure related parameters, the EGR rate in the cylinder can be specified with higher accuracy.

Next, an embodiment of an engine control apparatus to which the present invention is applied will be described.

The engine to be controlled in the present embodiment is a four-cycle reciprocating engine including an EGR system and an in-cylinder pressure sensor. The EGR system can connect the exhaust passage and the intake passage by an EGR pipe and adjust the amount of EGR gas by an EGR valve arranged on the EGR pipe. Although it is preferable that an EGR cooler is arranged on the EGR pipe, the EGR cooler is not necessarily indispensable to carry out the present invention. It is preferable that the in-cylinder pressure sensors are arranged on all cylinders, the in-cylinder pressure sensor can be arranged on at least one cylinder to carry out the present invention. Other formats of the engine are not limited. The engine may be a spark-ignition engine represented by a gasoline engine or may be a compression-ignition diesel engine. The engine may be a naturally-aspirated engine or may be a supercharge engine. If the engine is a spark-ignition engine, the injection system of the fuel may be a port injection system or may be an in-cylinder direct injection system.

Figure 5:
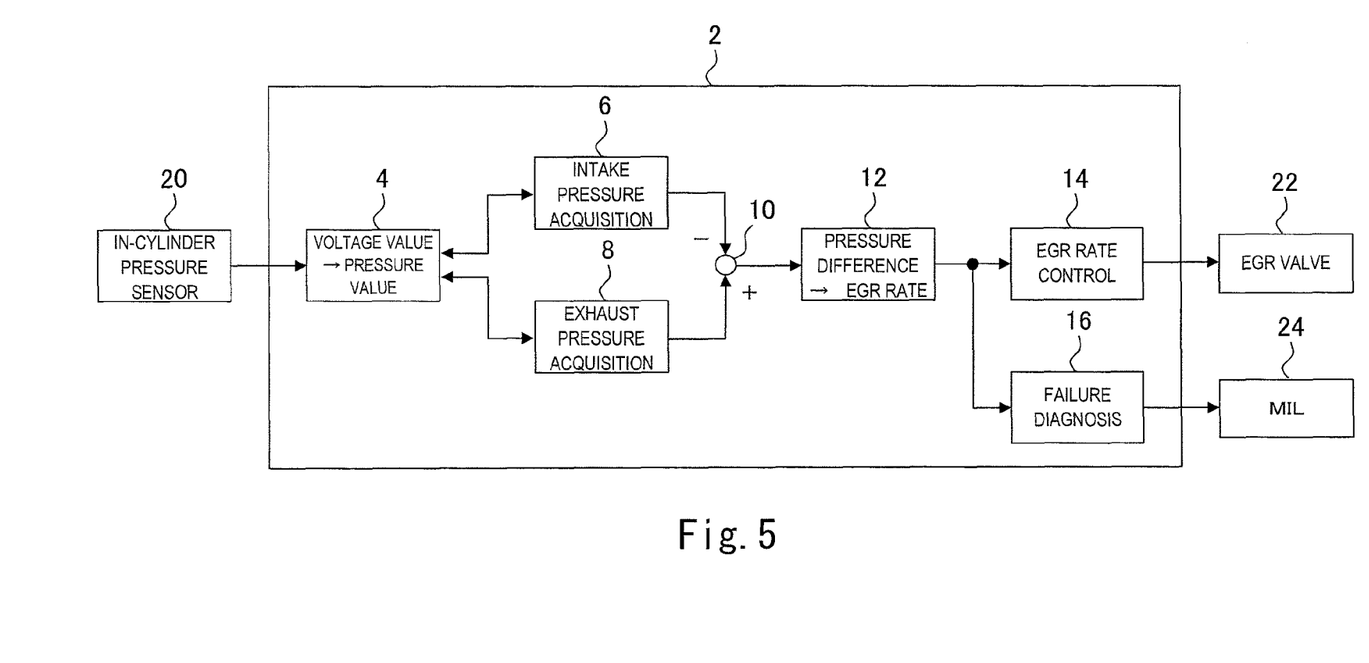
FIG. 5 is a block diagram showing a configuration of a control apparatus of an internal combustion engine according to an embodiment of the present invention.

FIG. 5 is a block diagram showing a configuration of an engine control apparatus 2 according to an embodiment of the present invention. Hereinafter, the configuration and functions of the engine control apparatus 2 will be described with reference to FIG. 5.

The engine control apparatus 2 operates an actuator included in the engine to control the operation of the engine. The actuator that can be operated by the engine control apparatus 2 includes an ignition apparatus, a throttle, a fuel injection apparatus, an EGR system, and the like. However, the engine control apparatus 2 operates an EGR valve 22 of the EGR system in the present embodiment, and the engine control apparatus 2 operates the EGR valve 22 to control the EGR rate in the engine cylinder. Various signals are input from a large number of sensors, such as an in-cylinder pressure sensor 20, to the engine control apparatus 2. The signals are used to control the engine. Particularly, an output signal of the in-cylinder pressure sensor 20 is mainly used to control the EGR rate.

Based on functions, the engine control apparatus 2 can be divided into a voltage-pressure conversion unit 4, an intake pressure acquisition unit 6, an exhaust pressure acquisition unit 8, a pressure difference calculation unit 10, an EGR rate calculation unit 12, an EGR rate control unit 14, and a failure diagnosis unit 16. As for the elements 4, 6, 8, 10, 12, 14, and 16, only elements related to the operation of the EGR valve 22 for the EGR rate control and elements related to failure diagnosis of the EGR valve 22 among various functional elements included in the engine control apparatus 2 are specially expressed in the drawings. Therefore, FIG. 5 is not intended to imply that the engine control apparatus 2 includes only the elements 4, 6, 8, 10, 12, 14, and 16. Each of the elements 4, 6, 8, 10, 12, 14, and 16 may be formed by dedicated hardware or may be virtually formed by software while sharing hardware.

The voltage-pressure conversion unit 4 imports an output signal of the in-cylinder pressure sensor 20. The voltage-pressure conversion unit 4 multiplies the output signal of the in-cylinder pressure sensor 20 by a predetermined gain to convert a voltage value to a pressure value. The intake pressure acquisition unit 6 acquires, from the voltage-pressure conversion unit 4, a value of the in-cylinder pressure (intake pressure) when the cylinder provided with the in-cylinder pressure sensor 20 is at the intake stroke. The exhaust pressure acquisition unit 8 acquires, from the voltage-pressure conversion unit 4, a value of the in-cylinder pressure (exhaust pressure) when the cylinder is at the exhaust stroke of the same cycle. The pressure difference calculation unit 10 calculates the pressure difference between the acquired exhaust pressure and intake pressure and inputs the pressure difference to the EGR rate calculation unit 12.

The EGR rate calculation unit 12 compares the pressure difference input from the pressure difference calculation unit 10 with a pressure difference in the case without the EGR. A value calculated based on information, such as the number of engine revolutions, degree of throttle opening, intake temperature, and water temperature, is used for the pressure difference in the case without the EGR. Or, a learning value obtained by preliminary learning is used. The EGR rate calculation unit 12 compares the comparison result with a prepared map to calculate the EGR rate corresponding to the pressure difference between the exhaust pressure and the intake pressure.

The EGR rate calculated by the EGR rate calculation unit 12 is an estimation value of the actual EGR rate at the present time. The EGR rate control unit 14 uses the EGR rate calculated by the EGR rate calculation unit 12 as feedback information to control the EGR rate. Hereinafter, details of the EGR control by the EGR rate calculation unit 12 will be described with reference to FIG. 6.

Figure 6:
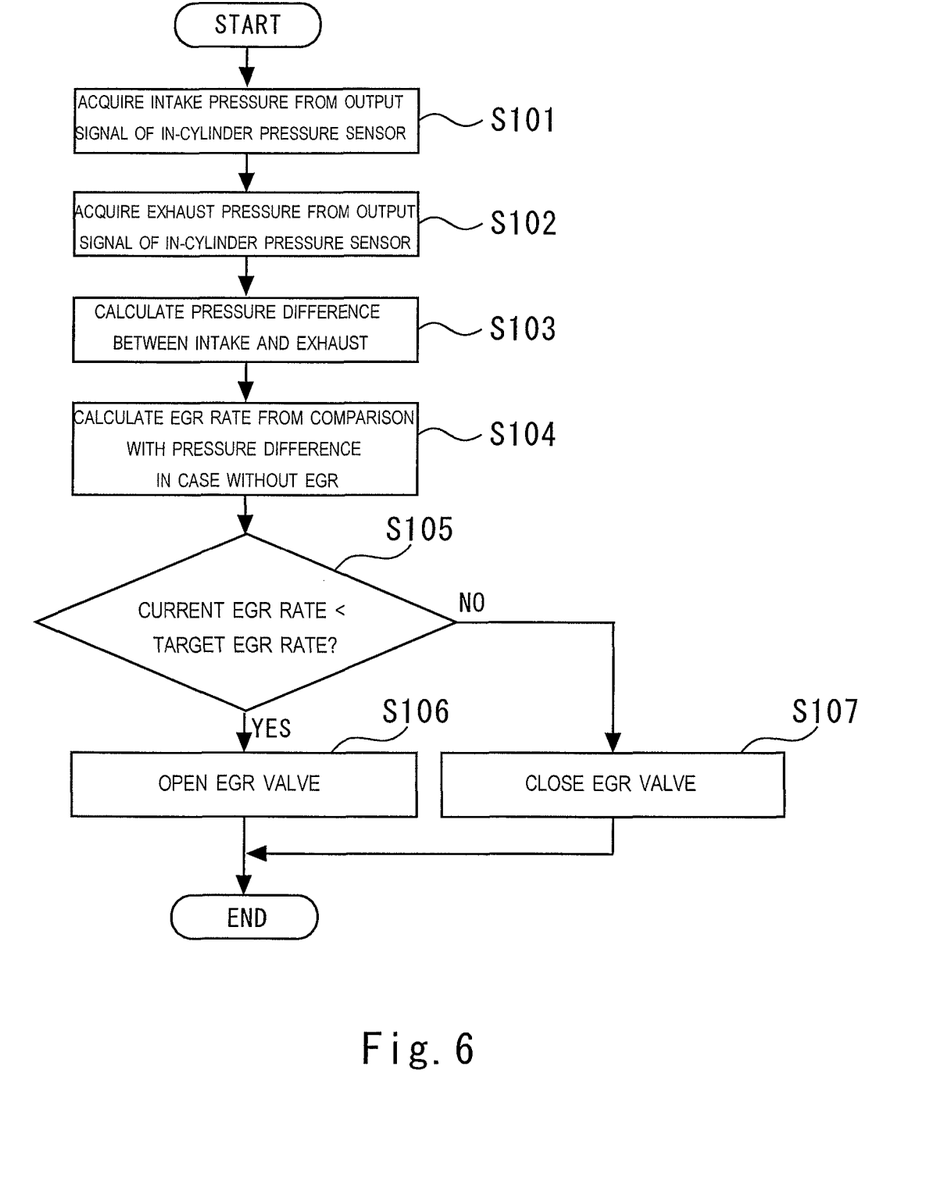
FIG. 6 is a flow chart showing a routine of EGR rate control performed in the embodiment of the present invention.

FIG. 6 is a diagram illustrating a flow of the EGR control executed in the present embodiment by a flow chart. In the first step S101 in the flow chart of FIG. 6, the intake pressure is acquired from the output signal of the in-cylinder pressure sensor 20. In step S102, the exhaust pressure of the same cycle is acquired from the output signal of the in-cylinder pressure sensor 20. In step S103, the pressure difference between the exhaust pressure and the intake pressure is calculated, and in the following step S104, the current EGR rate (EGR rate of the air-fuel mixture provided for the combustion in the same cycle) is calculated based on the comparison with the pressure difference in the case without the EGR. In step S105, the current EGR rate calculated in step S104 and the target EGR rate are compared. As a result of the comparison, if the current EGR rate is lower than the target EGR rate, the EGR valve 22 is operated toward the open-side in step S106. On the other hand, if the current EGR rate is equal or greater than the target EGR, the EGR valve 22 is operated toward the close-side in step S107.

The engine control apparatus 2 of the present embodiment carries out the EGR control in the foregoing flow. The method of the present invention is used to specify the EGR rate that is performed in the flow. Therefore, the current EGR rate can be correctly specified, and the comparison of the correctly specified current EGR rate with the target EGR rate can control the EGR rate in the cylinder with high accuracy.

Meanwhile, the pressure difference between the exhaust pressure and the intake pressure calculated by the pressure difference calculation unit 10 is input to the failure diagnosis unit 16. The failure diagnosis unit 16 observes how the pressure difference is changed by the opening and closing of the EGR valve 22 to diagnose a failure of the EGR valve 22 from the observation result. If it is determined that the EGR valve 22 has a failure, the failure diagnosis unit 16 requests the EGR rate control unit 14 to terminate the EGR rate control and lights up an MIL (Malfunction indicator lamp) 24. Hereinafter, details of the failure diagnosis by the failure diagnosis unit 16 will be described with reference to FIG. 7.

Figure 7:
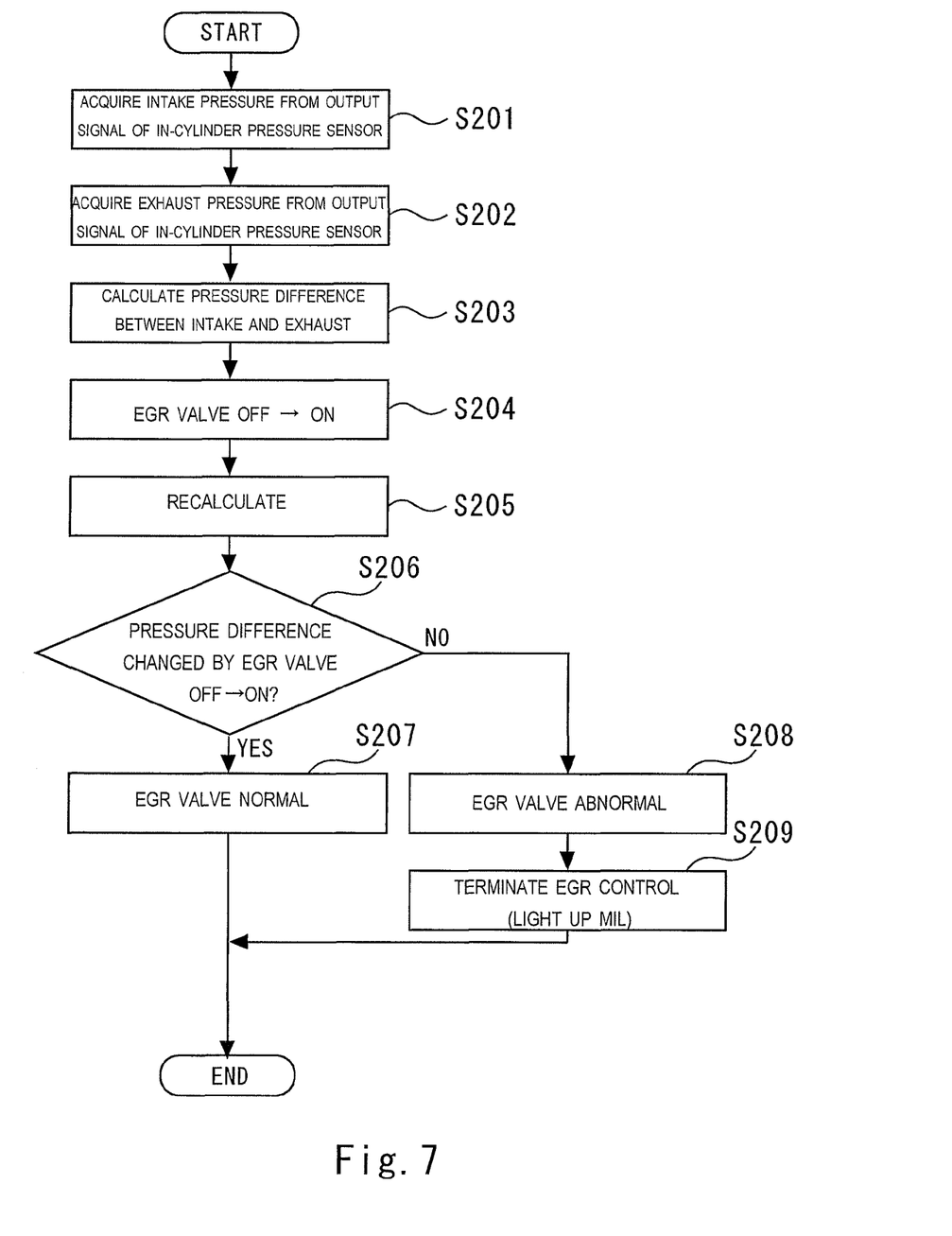
FIG. 7 is a flow chart showing a routine of failure diagnosis performed in the embodiment of the present invention.

FIG. 7 is a diagram illustrating a flow of the failure diagnosis executed in the present embodiment by a flow chart. In the first step S201 in the flow chart of FIG. 7, the intake pressure is acquired from the output signal of the in-cylinder pressure sensor 20 when the EGR valve 22 is in a closed state. In step S202, the exhaust pressure of the same cycle is acquired from the output signal of the in-cylinder pressure sensor 20. In step S203, the pressure difference between the exhaust pressure and the intake pressure is calculated.

In step S204, the EGR valve 22 is switched from the closed state (OFF) to an open state (ON). In the following step S205, the process from step S201 to step S203 is executed again to recalculate the pressure difference between the exhaust pressure and the intake pressure. In step S206, it is determined whether there is a change in the pressure difference when the EGR valve 22 is switched from the closed state to the open state. As a result of the determination, if there is a change in the pressure difference, it is diagnosed that the EGR valve 22 is normal in step S207. On the other hand, if there is no change in the pressure difference, it is diagnosed that the EGR valve 22 is abnormal in step S208, the EGR rate control is terminated, and the MIL 24 is lit up in step S209.

The engine control apparatus 2 of the present embodiment carries out the failure diagnosis of the EGR valve 22 in the foregoing flow. Since the pressure difference between the exhaust pressure and the intake pressure is a parameter sensitive to the change in the EGR rate, the pressure difference can be used as an index of the failure diagnosis to correctly diagnose the failure of the EGR valve 22.

The foregoing is the description of an embodiment of the engine control apparatus to which the present invention is applied. However, this is just an embodiment and is not intended to limit the present invention to the embodiment. Therefore, the engine control apparatus may be configured to calculate the pressure difference between the exhaust pressure and the intake pressure for a plurality of cycles to perform the EGR control based on a statistic thereof and to perform the failure diagnosis. An average value, a median value, a minimum value, a maximum value, or the like can be used as the statistic.

The engine control apparatus may also be configured to calculate the indicated work at the strokes from the in-cylinder pressure and may calculate, as information for specifying the EGR rate, the difference between the values of the indicated work at the intake stroke and the indicated work at the exhaust stroke. Alternatively the engine control apparatus may be configured to calculate the indicated average effective pressures at the strokes from the in-cylinder pressure and may calculate, as information for specifying the EGR rate, the difference between the values of the indicated average effective pressure at the intake stroke and the indicated average effective pressure at the exhaust stroke.

The engine control apparatus may also be configured to control the operation of the engine according to the current EGR rate specified by the method of the present invention. For example, an ignition period, a fuel injection amount, an intake air amount, valve timing, and the like may be adjusted to maximize the fuel efficiency and the exhaust gas performance under the current EGR rate.

Furthermore, various modified examples are also possible for the configuration of the engine controlled by the engine control apparatus. For example, although the engine of the embodiment includes the EGR system with the EGR valve, the EGR system is one of the actuators that can change the EGR rate. An engine including a variable valve timing mechanism that changes the valve timing of an intake valve or an exhaust valve can change so-called internal EGR by operation of the variable valve timing mechanism to control the EGR rate in the cylinder. An engine including a throttle can change the intake pipe pressure by the throttle to control the EGR rate in the cylinder.

REFERENCE SIGNS LIST 2 engine control apparatus
4 voltage-pressure conversion unit
6 intake pressure acquisition unit
8 exhaust pressure acquisition unit
10 pressure difference calculation unit
12 EGR rate calculation unit
14 EGR rate control unit
16 failure diagnosis unit
20 in-cylinder pressure sensor
22 EGR valve
24 MIL

The invention claimed is:

1. A specifying method of an EGR rate which is a ratio of an EGR gas in an air-fuel mixture provided for combustion in an internal combustion engine, comprising:
calculating a value of a first in-cylinder pressure related parameter related to an in-cylinder pressure at an intake stroke from an output signal of an in-cylinder pressure sensor at the intake stroke;
calculating a value of a second in-cylinder pressure related parameter related to the in-cylinder pressure at an exhaust stroke from an output signal of the in-cylinder pressure sensor at the exhaust stroke of a same cycle as the intake stroke; and
specifying an EGR rate of the air-fuel mixture provided for combustion in the same cycle from a result of a comparison of a difference between values of the first in-cylinder pressure related parameter and the second in-cylinder pressure related parameter with EGR and a difference between values of the first in-cylinder pressure related parameter and the second in-cylinder pressure related parameter without EGR, and operating an actuator to bring the specified EGR rate in line with a target EGR rate.

2. The specifying method of the EGR rate in the internal combustion engine according to claim 1, wherein
indicated work at the intake stroke is calculated as the first in-cylinder pressure related parameter from the in-cylinder pressure obtained by converting the output signal of the in-cylinder pressure sensor, and
indicated work at the exhaust stroke is calculated as the second in-cylinder pressure related parameter from the in-cylinder pressure obtained by converting the output signal of the in-cylinder pressure sensor.

3. The specifying method of the EGR rate in the internal combustion engine according to claim 1, wherein
an indicated average effective pressure at the intake stroke is calculated as the first in-cylinder pressure related parameter from the in-cylinder pressure obtained by converting the output signal of the in-cylinder pressure sensor, and
an indicated average effective pressure at the exhaust stroke is calculated as the second in-cylinder pressure related parameter from the in-cylinder pressure obtained by converting the output signal of the in-cylinder pressure sensor.

4. The specifying method of the EGR rate in the internal combustion engine according to claim 1, wherein
the in-cylinder pressure at a predetermined crank angle of the intake stroke obtained by converting the output signal of the in-cylinder pressure sensor is calculated as the first in-cylinder pressure related parameter, and
the in-cylinder pressure at a predetermined crank angle of the exhaust stroke obtained by converting the output signal of the in-cylinder pressure sensor is calculated as the second in-cylinder pressure related parameter.

5. A control apparatus of an internal combustion engine comprising: an actuator that can change an EGR rate, which is a ratio of an EGR gas in an air-fuel mixture provided for combustion; and an in-cylinder pressure sensor, the control apparatus of the internal combustion engine comprising:
first in-cylinder pressure related parameter calculation means for calculating a value of a first in-cylinder pressure related parameter related to an in-cylinder pressure at an intake stroke from an output signal of the in-cylinder pressure sensor at the intake stroke;
second in-cylinder pressure related parameter calculation means for calculating a value of a second in-cylinder pressure related parameter related to an in-cylinder pressure at an exhaust stroke from an output signal of the in-cylinder pressure sensor at the exhaust stroke of a same cycle as the intake stroke;
inter-parameter difference calculation means for calculating an inter-parameter difference between values of the first in-cylinder pressure related parameter and the second in-cylinder pressure related parameter for one or a plurality of cycles; and
control means for specifying an EGR rate of an air-fuel mixture provided for combustion in the same cycle from a result of a comparison between the inter-parameter difference with EGR and an inter-parameter difference in the case without EGR and operating the actuator to bring the specified EGR rate in line with a target EGR rate.

6. The control apparatus of the internal combustion engine according to claim 5, wherein
the control means operates the actuator based on a statistic of the inter-parameter difference obtained for a plurality of cycles.

7. The control apparatus of the internal combustion engine according to claim 5, wherein
the control means operates the actuator based on the inter-parameter difference obtained for one cycle.

8. The control apparatus of the internal combustion engine according to claim 5, further comprising
failure diagnosis means for diagnosing a failure of the actuator based on a change in the inter-parameter difference before and after operation when the actuator is operated to change the EGR rate.

9. A control apparatus of an internal combustion engine comprising: an actuator that can change an EGR rate, which is a ratio of an EGR gas in an air-fuel mixture provided for combustion; and an in-cylinder pressure sensor, the control apparatus of the internal combustion engine comprising:
a computing unit that is programmed to:
calculate a value of a first in-cylinder pressure related parameter related to an in-cylinder pressure at an intake stroke from an output signal of the in-cylinder pressure sensor at the intake stroke;
calculate a value of a second in-cylinder pressure related parameter related to an in-cylinder pressure at an exhaust stroke from an output signal of the in-cylinder pressure sensor at the exhaust stroke of a same cycle as the intake stroke; and calculate an inter-parameter difference between values of the first in-cylinder pressure related parameter and the second in-cylinder pressure related parameter for one or a plurality of cycles; and a control unit that is programmed to specify the EGR rate of an air-fuel mixture provided for combustion in the same cycle from a result of a comparison between the inter-parameter difference with EGR and an inter-parameter difference in the case without EGR and to operate the actuator to bring the specified EGR rate in line with a target EGR rate.

10. The control apparatus of the internal combustion engine according to claim 9, wherein the control unit is programmed to operate the actuator based on a statistic of the inter-parameter difference obtained for a plurality of cycles.

11. The control apparatus of the internal combustion engine according to claim 9, wherein the control unit is programmed to operate the actuator based on the inter-parameter difference obtained for one cycle.

12. The control apparatus of the internal combustion engine according to claim 9, further comprising a failure diagnosis unit that is programmed to diagnose a failure of the actuator based on a change in the inter-parameter difference before and after operation when the actuator is operated to change the EGR rate.

* * * * *